Patented June 19, 1945

2,378,559

UNITED STATES PATENT OFFICE 2,378,559

SYNTHETIC ELASTOMERS

Jonas Kamlet, New York, N. Y., assignor to Miles Laboratories, Inc., Elkhart, Ind., a corporation of Indiana No Drawing. Application October 14, 1942, Serial No. 462,010

6 Claims. (Cl. 260—79)

This invention relates to synthetic elastomers and more particularly, to synthetic polysulfide elastomers. The term "elastomer" has been proposed by Fisher (Ind. Eng. Chem. 31, 941 (1939)) to comprise all substances possessing rubber-like characteristics, and is finding widespread acceptance. This invention relates, therefore, to synthetic rubber-like substances characterized by the presence of polysulfide linkages within their molecular structures.

It has for its purpose to provide a new series of elastomers of good extensibility and tensile strength and resistance to the solvent action of benzene, gasoline, and similar hydrocarbons.

It has for its further purpose to provide a new series of elastomers which may be prepared from cheap and readily available raw materials by the use of relatively simple and inexpensive equipment.

Polysulfide elastomers were patented in 1932 by Patrick (U. S. Patent 1,890,191) who obtained these products by the reaction of dihalogenated olefines with alkaline polysulfides. Since that time a great number of patents have been issued to this inventor covering synthetic polysulfide elastomers obtained by the reaction of alkaline polysulfides with a variety of organic compounds possessing at least one reactive negative radical on each of two different carbon atoms, such as B,B'-dichlorethyl ether, B,B'-dichlorethyl formal, B,B'-dimercaptoethyl ether, etc., (e. g., U. S. Patents 2,142,144; 2,142,145; 2,195,380; 2,206,642; 2,206,643; 2,216,044; 2,278,128).

I find that synthetic polysulfide elastomers of good extensibility, coherence, resiliency, tensile strength and resistance to organic solvents may be obtained by reacting (a) A member of the group consisting of the dihalogenated paraffins containing not more than five carbons and having its halogen atoms linked to adjacent carbons, (b) A member of the group of compounds comprising the lower acyl esters of vinyl alcohol and (c) A member of the group consisting of the polysulfides of ammonium, the alkali metals, and the alkali-earth metals.

Typical examples of the dihalogenated paraffins that may be used in the synthesis of these elastomers are: 1,2-dichlorethane (ethylene dichloride), 1,2-dichlorpropane (propylene dichloride), and 1,2-dibromethane (ethylene dibromide). Paraffins substituted on adjacent carbon atoms by the identical halogens (as the above), or by different halogens, such as 1-chlor, 2-bromethane (ethylene chlorbromide) and 1-chlor, 2-brompropane (propylene chlorbromide) are equally suitable. The preferred members of this group are ethylene dichloride and propylene dichloride, by reason of their low cost and ready availability. Large amounts of these two compounds are at present being manufactured by the chlorination of the corresponding olefines.

The lower acyl esters of vinyl alcohol that may be used in this reaction may be represented by the general formula $$CH_2{:}CH.O.CO.R$$

where R represents a member of the group consisting of hydrogen and lower alkyl radicals. Typical members of this group are vinyl formate, vinyl acetate, vinyl propionate and vinyl butyrate. These compounds may be prepared by the reaction of acetylene with the corresponding aliphatic acid in the presence of a mercuric compound as a catalyst (Toussaint, U. S. Patent 2,239,763). For a considerable time, use of vinyl esters has been commercially limited to vinyl acetate, for lack of suitable processes to produce homologs of it at a commensurate cost. The process of Toussaint is a solution of this problem and is intended to supply these homologous equivalents of vinyl acetate.

The present invention contemplates use of the vinyl esters of aliphatic acids which are reactive in the manner herein described, like vinyl acetate, to produce elastomers.

The preferred member of this group of vinyl esters to use in the synthesis of the polysulfide elastomers of the present invention is vinyl acetate, which is not expensive and readily available in large quantities.

The polysulfides suitable for use in this reaction may be represented by the general formula: $M_2S_x$, where M represents a hydrogen equivalent of ammonium, an alkali-metal or an alkali-earth metal, where S represents sulfur, and $x$ represents an integer from three to six. Typical members of this group are sodium pentasulfide ($Na_2S_5$), calcium tetrasulfide ($CaS_4$), and ammonium hexasulfide of the formula ($NH_4)_2S_6$. These polysulfides may be prepared by refluxing an aqueous solution of the corresponding normal-valency sulfide of the type $Na_2S$ with the calculated amount of elemental sulfur until the latter has completely dissolved. Alternatively, they may be prepared by reacting an aqueous solution or suspension of an alkali metal, or alkali earth-metal hydroxide, with the calculated amount of elemental sulfur until the latter has completely dissolved, in accordance with the following equation:

$$6MOH + (2x+2)S \rightarrow M_2S_2O_3 + 2M_2S_x + 3H_2O$$

whereby the corresponding thiosulfate is also formed.

The proportions of reagents found suitable for the preparation of this new series of elastomers are substantially the following: one mole of the dihalogenated paraffin, from 0.05 to one mole of the vinyl ester, and one mole of the polysulfide. The reaction is effected by adding the dihalogenated paraffin and the vinyl ester to an aqueous solution of the polysulfide and heating the mixture under reflux for five to ten hours with or without agitation. As a general rule, increasing the relative amount of the vinyl esters produces a softer condensate, whereas increasing the reaction time produces a harder product. The elastomers obtained in this manner are light to darkbrown in color and may be worked or rolled at temperatures in excess of 100° C. They may be vulcanized with the metallic oxides as vulcanizing agents and sulfur as an accelerator, and may be extended with fillers (such as magnesium hydroxide, zinc oxide, carbon black, etc.) for the development of satisfactory tensile strength characteristics. They may also be admixed with other elastomers, natural or synthetic, in the manner well-known to the art.

It is believed that these new synthetic elastomers are true copolymers of vinyl acetate and vinyl polysulfides. Thus, it may be considered that the dihalogenated paraffin (e. g., ethylene dichloride) first reacts with the polysulfide (e. g., $Na_2S_5$) in the following manner:

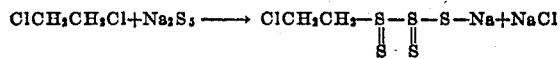

and then again by the elimination of NaCl forms a vinyl polysulfide:

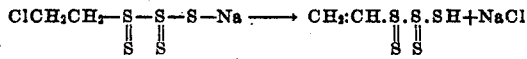

The unstable configuration of this putative vinyl polysulfide readily lends itself to further reaction, i. e., polymerization. The ability of different vinyl compounds to copolymerize is well known. Thus, under proper condition, vinyl acetate will form copolymers with vinyl chloride, polyvinyl alcohol, styrene (vinyl benzene), and acrylonitrile (vinyl cyanide). These vinyl copolymers are well-known in the art. In a similar manner it is believed that the above described vinyl polysulfide, in statu nascendi, then copolymerizes with the vinyl ester to form the elastomers of the present invention.

Thus, these new elastomers may be represented as polymers containing the monomer unit:

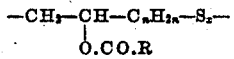

where R represents a member of the group consisting of hydrogen and lower alkyl groups, $n$ is an integer from two to five, and $x$ is an integer from three to six.

While the above theoretical considerations are advanced in an attempt to explain the chemical nature of this invention, the applicant does not wish to be bound by this theory or in any sense be restricted thereto in his claims. Other rational explanations will readily be perceived by any person skilled in the art.

It is interesting to note in this regard that vinyl acetate per se, when reacted with an alkaline polysulfide, will polymerize to a brittle, brown resin which does not, however, possess any elastomeric properties. Other polysulfide copolymers are also known. Thus, Patrick (U. S. Patent 2,278,127) described a polysulfide elastomer containing polymerized butadiene. Frost (U. S. Patent 2,278,368) described a polysulfide copolymer of ethylene dichloride and halogenated paraffins. Polysulfide copolymers of ethylene dichloride with aliphatic, aromatic and heterocyclic aldehydes are described in British Patent 542,635.

The following examples are given to define and illustrate this invention but in no way to limit it to reagents, proportions or conditions described therein. Obvious modifications will occur to any person skilled in the art. All proportions given are in terms of parts by weight.

*Example I*

Two hundred and forty parts of sodium sulfide, technical ($Na_2S.9H_2O$) (1 mole) is dissolved in 250 parts of water and the solution is boiled with 128 parts of sulfur (4 moles) until the sulfur has completely dissolved. The resultant solution of sodium pentasulfide is cooled to 60° C. and 86 parts of vinyl acetate (1 mole) and 99 parts of ethylene dichloride (1 mole) are added. The mixture is then boiled under reflux with occasional stirring for eight hours. The mixture is then cooled, acidified with concentrated hydrochloric acid and the liquid phase is decanted from the solid elastomer residue. The latter is then washed free of soluble material with boiling water, and dried.

*Example II*

One hundred and ninety-two parts of sulfur (6 moles) is added in small portions to a boiling solution of 120 parts of caustic soda (3 moles) in 500 parts of water. After all of the sulfur has been added, the mixture is boiled until the sulfur has completely dissolved. The sulfur may be moistened with alcohol to facilitate its wetting on being added to the boiling alkali solution. To the resultant orange-brown solution of sodium pentasulfide there is now added 43 parts of vinyl acetate (0.5 mole) and 99 parts of ethylene dichloride (1.0 mole). The mixture is boiled under reflux with occasional stirring for six hours, cooled and the liquid phase is decanted from the solid elastomer residue. The latter is now washed free of soluble material with boiling water, and dried.

*Example III*

A slurry is made by slaking 85 parts of calcium oxide (1.5 moles) in 500 parts of water and 160 parts of sulfur (5.0 moles) is added. The mixture is boiled under reflux for two hours, then filtered hot from insoluble material. To the filtrate comprising substantially a solution of calcium tetrasulfide, there is now added 113 parts of propylene dichloride (1.0 mole), 4.3 parts of vinyl acetate (0.05 mole) and 7.5 parts of freshly precipitated magnesium hydroxide. The mixture is boiled under reflux for ten hours with occasional stirring, then allowed to cool. Concentrated hydrochloric acid is now added until the reaction mixture is acid to bromphenol blue indicator, the liquid phase is decanted from the solid elastomer residue and the latter is washed free of soluble material with boiling water, and dried.

Example IV 240 parts of technical grade sodium sulfide (1 mole) $Na_2S \cdot 9H_2O$, are dissolved in 250 parts of water and boiled with 128 parts (4 moles) of sulfur, until the sulfur is dissolved, thus forming 1 mole of sodium pentasulfide $Na_2S_5$. The solution is cooled to 60° C. and to it are added 10 parts (0.1 mole) of vinyl propionate, and 99 parts (1 mole of ethylene dichloride. The mixture is boiled under reflux conditions for 8 hours. Then it is cooled and acidified with concentrated hydrochloric acid. The resulting liquid phase is decanted from the resulting solid elastomer. The latter is washed with boiling water until free of soluble material, and then dried, thus providing an elastomer in useful form as a substitute for rubber.

The products made by each of the above examples have been examined for properties pertaining to its use as a rubber substitute in one or more ways. Each has good extensibility, good tensile strength, and good resistance to the solvent action of benzene, gasoline, and other hydrocarbons. The term "good" with respect to these properties definitely means "suitable" for some use as a rubber substitute where these properties come into play.

From the foregoing it will be understood by those skilled in the art that numerous changes and modifications may be made without departing from the spirit and scope of the invention as expressed in the appended claims.

I claim:

1. The process for the preparation of synthetic elastomers which comprises heating in an aqueous medium at a reaction temperature a mixture comprising essentially 1 mole of ethylene dichloride, from 0.05 to 1 mole of vinyl acetate, and 1 mole of sodium polysulfide.

2. Synthetic elastomers prepared by the process of claim 1.

3. A process of producing a reaction product containing sulfur which comprises heating at a reaction temperature 1 mole of polysulfide dissolved in an aqueous medium and having the general formula: $M_2S_x$ wherein M represents a hydrogen equivalent of a member of the group consisting of ammonium, the alkali metals and the alkaline-earth metals, and wherein $x$ is an integer from 3 to 6 inclusive, and 1 mole of a dihalogenated paraffin containing not more than 5 carbon atoms and having its halogen atoms bonded to adjacent carbon atoms; and the carrying out of said reaction in the presence of from 0.05 to 1 mole of a compound of acyl ester of vinyl alcohol with unsubstituted saturated monocarboxylic aliphatic acid having not more than 4 carbon atoms.

4. An organic polysulfide product made by the reaction of process claim 3.

5. The process for the preparation of synthetic elastomers which comprises heating in an aqueous medium to the normal reflux temperature a mixture comprising essentially 1 mole of a dihalogenated paraffin containing not more than 5 carbon atoms and having its halogen atoms bonded to adjacent carbon atoms, from 0.05 to 1 mole of acyl ester of vinyl alcohol with unsubstituted saturated monocarboxylic aliphatic acid having not more than 4 carbon atoms, and 1 mole of a compound of the general formula: $M_2S_x$ wherein M represents a hydrogen equivalent of a member of the group consisting of ammonium, the alkali metals and the alkaline-earth metals, and wherein $x$ is an integer from 3 to 6 inclusive.

6. Synthetic elastomers prepared by the process of claim 5.

JONAS KAMLET.